United States Patent [19]
Kato et al.

[11] 3,827,811
[45] Aug. 6, 1974

[54] OPTICAL MEASURING DEVICE EMPLOYING A DIAPHRAGM WITH REFLECTING SURFACES

[75] Inventors: Yoshio Kato, Yokohama; Yutaka Ogiwara, Niiza, both of Japan

[73] Assignee: Nippon Kogaku K.K., Tokyo, Japan

[22] Filed: Mar. 7, 1973

[21] Appl. No.: 338,769

[30] Foreign Application Priority Data
Mar. 15, 1972  Japan.................................. 47-25782
Mar. 15, 1972  Japan.................................. 47-30339

[52] U.S. Cl.............. 356/225, 250/237 R, 250/511, 350/81, 350/272, 356/201, 356/219
[51] Int. Cl........................... G01j 1/42, G01n 21/22
[58] Field of Search ............ 356/51, 225, 219, 201; 350/81, 266, 272; 250/237 R, 511, 237

[56] References Cited
UNITED STATES PATENTS
3,256,771  6/1966  Field et al........................... 356/225
3,297,873  1/1967  Hovnanian et al................... 356/51
3,527,536  9/1970  Alpen ................................. 356/201

*Primary Examiner*—Vincent P. McGraw
*Attorney, Agent, or Firm*—Shapiro and Shapiro

[57] ABSTRACT

An optical measuring device employs an objective lens and an adjustable diaphragm disposed in a focal plane of the lens. The diaphragm has a portion formed as a reflecting surface so that part of the light from the object focused by the lens on the diaphragm passes through the aperture, while the remaining light is reflected by the reflecting surface. Measuring means is disposed behind the diaphragm to receive and measure the light passing through the aperture, and a viewing optical system receives the light reflected by the reflecting surface of the diaphragm.

10 Claims, 9 Drawing Figures

OPTICAL MEASURING DEVICE EMPLOYING A DIAPHRAGM WITH REFLECTING SURFACES

BACKGROUND OF THE INVENTION

1. Field of the Invention

The present invention relates to an optical measuring device for selecting a desired portion of a field of view and to measure such portion of the field.

2. Description of the Prior Art

Various optical measuring devices have heretofore been proposed which are adapted to measure light passed through an aperture of a diaphragm located at a focal plane of an objective lens. However, the known devices have one or more of the following disadvantages:

1. it is impossible to select a desired portion of the field of view by varying the size of the diaphragm aperture while viewing the whole field of view;

2. it is impossible to continuously vary the size of the diaphragm aperture according to the size of desired portion of the field; and 3. where a beam splitter is employed for the viewing the whole field of view and for measuring the desired portion, the intensity of light for the measurement is reduced.

SUMMARY OF THE INVENTION

An object of the present invention is to provide an improved optical measuring device which is able to select and measure a portion within a field of view by continuously varying the size of an aperture of a diaphragm located at a focal plane of an objective lens while viewing the field of view.

According to this invention, a stop means variable in aperture stop is disposed in a position of image formation of an objective lens. The stop means has a light shielding portion formed as reflecting surfaces, and consequently, a part of the light from an object to be measured focused on the stop means is passed through the aperture stop while the remaining light is reflected by the reflecting surfaces. Measuring means is disposed behind the stop means to receive and measure the light passing through the stop means, and a viewing optical system is positioned to receive light reflected by the reflecting surfaces of the stop means.

DESCRIPTION OF THE PREFERRED EMBODIMENTS

Figure 1:
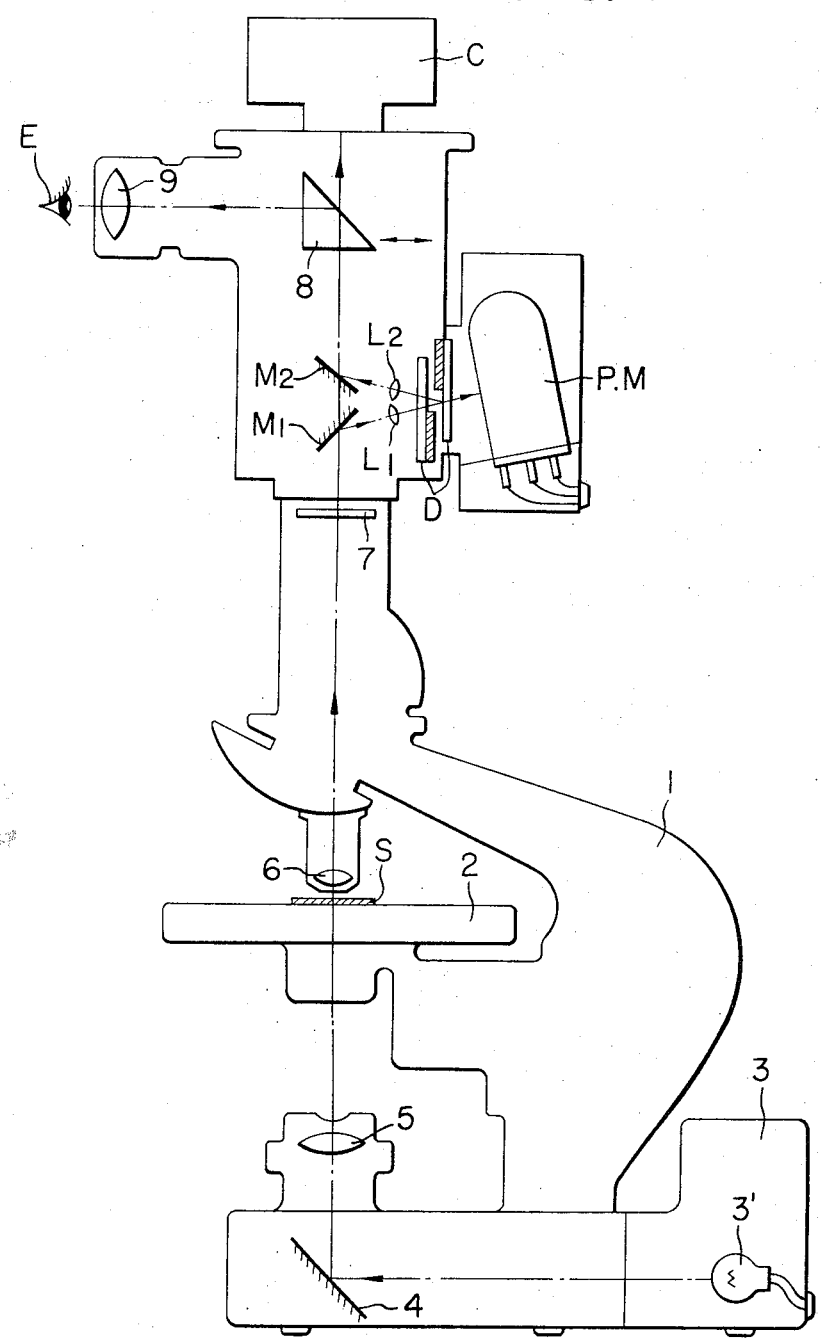
FIG. 1 illustrates the present invention as applied to a microscope photometer.

In FIG. 1, which schematically shows a microscope photometer, a microscope body 1 is provided with a table 2 mounted to slide to the right and left and in a direction perpendicular to the plane of sliding. The table is intended to support an object S to be measured. Light emitted from a light source 3' located in a lamp housing 3 reaches the object S by being reflected by a mirror 4, passing through a lens 5, and through an aperture (not shown) in the table 2.

An objective lens 6 focuses the light from the object S onto adjustable diaphragm D, the light passing through a monochromatic filter 7, being reflected by a mirror $M_1$, and passing through a relay lens $L_1$ in its path to the diaphragm. Accordingly, an image of the object S to be measured is formed on the adjustable diaphragm D. As hereinafter described in detail, the adjustable diaphragm has on its central portion an aperture through which the light passes, and a surrounding light shielding portion which is made as a reflecting surface.

The light which passes through the aperture portion of the adjustable diaphragm D is measured by a measuring device, designated P.M. The light from the object S to be measured which is reflected by the reflection portion of the diaphragm passes through the relay lens $L_2$, and is reflected by a mirror $M_2$. The light reflected by the mirror $M_2$ is then reflected by a prism 8, and reaches eye E of a viewer through an eyepiece 9. If it is desired to record the measurements, the prism 8 is retracted from the optical path, whereupon the light reflected by the mirror $M_2$ is directed to a camera C.

The construction and operation of the adjustable diaphragm D will now be described in detail with reference to FIGS. 2A, 2B, 2C and 2D. A plurality of diaphragm blades 10 and 20 are made of transparent glass. While any suitable number of blades may be used, it is preferred to use two blades as illustrated. The blades are each partly finished to form a mirror face; that is, the stop blades have each transparent portions 10b, 20b which provide the aperture, and light shielding portions 10a, 20a which form a light reflecting portion, as indicated by the oblique lines. As shown in FIG. 2C, the reflecting surface portion of each blade is preferably formed at the side of the blade facing the other blade. Although the blades and the transparent portions 10b, 20b are shown to be square in the illustrated embodiment of the invention, it will be apparent that they may be made in other shapes or contours.

Figure 2A:
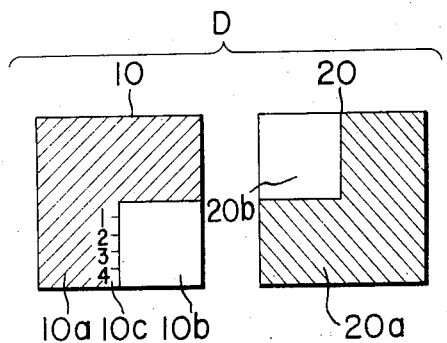
FIGS. 2A, 2B, 2C and 2D illustrate an adjustable diaphragm made in accordance with the invention.
Figure 2B:
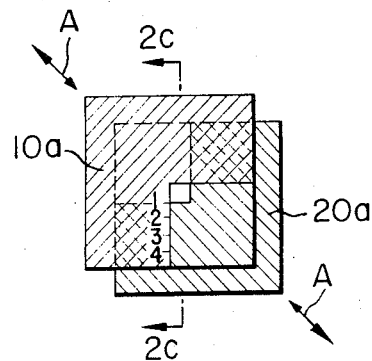

The stop blades 10 and 20 are arranged so that their transparent portions 10b and 20b may be overlapped as shown in FIG. 2B. The blades or one of them is slidably guided by suitable means (not shown) in a diagonal direction as indicated by the arrow A, and the size of the aperture, or the amount that the transparent portions 10b and 20b are overlapped, may be continuously varied. Where the blades are both mounted for sliding movement toward and away from each other in equal amounts in the indicated diagonal direction A, the center of the aperture is maintained stationary though the size of the aperture is varied.

In FIG. 2C, which is a section taken in the plane of line 2C—2C of FIG. 2B, light 100 reaching the adjustable diaphragm D through the relay lens $L_1$ (see FIG. 1) has a portion thereof reflected by the reflecting portions 10a, 20a to furnish the reflected light 100a reaching the relay lens $L_2$ (see FIG. 1). The light 100b which is not reflected passes through the transparent overlapped portions 10b and 20b constituting the aperture of the diaphragm and thus reaches the measuring device P.M.

Figure 2D:
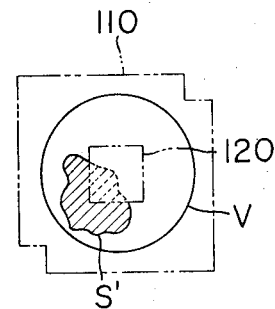
Figure 2C:
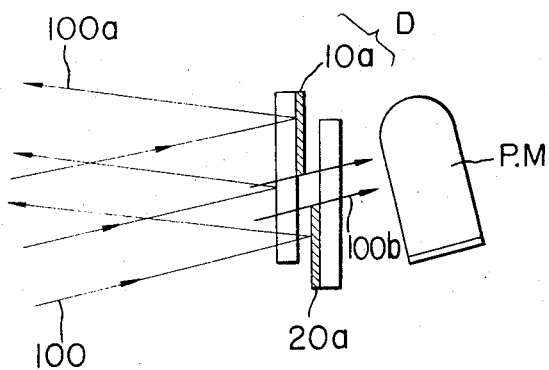

FIG. 2D shows a field of view V seen by the eye E (FIG. 1). The reflecting portion and the aperture portion of the adjustable diaphragm are represented by the areas 110 and 120, respectively, and the image of the object to be measured is indicated by S'. Here, since transparent glass has a reflection factor of approximately 4 per cent, approximately 4 per cent of light incident on the transparent portions 10*b* and 20*b* is reflected therefrom. As a result, the image of the object to be measured appears faintly in the aperture portion 120. This is indicated by the broken line portion of the image S' within the aperture.

In order to be able to view the size of the aperture of the adjustable diaphragm variable aperture stop from the eyepiece 9, a scale 10C is provided adjacent a transparent portion on one or both of the blades. Accordingly, and as shown for example in FIG. 2B, the size of the diaphragm aperture may be recognized by reading out graduation 1. Since the diaphragm D is positioned on the focal plane of the objective lens 6, the scale 10C, as well as the image of the object to be measured, are viewed through the eye-piece 9 or recorded by the camera C.

The diaphragm blades 10 and 20 may be made of metal instead of transparent glass. The metal is made highly reflective or specular as known in the art, and the blades are made with cut-out portions corresponding to the transparent portions 10*b*, 20*b* of the glass blades. With blades of metal, there is no reflection factor, and even a faint image does not appear in the aperture area 120.

The operation of the microscope photometer will now be described. The variable diaphragm D is stopped down to the minimum aperture, and the object S to be measured is suitably positioned by moving the table 2 while observing the field of view through the eyepiece 9 to align a part of the object with the diaphragm aperture. The diaphragm D is opened according to the size of the specimen being measured and light only from the part being measured is caused to pass through the aperture and enter the measuring device P.M. Thereafter, the measuring device is actuated to measure the transmitted light.

Figure 3A:
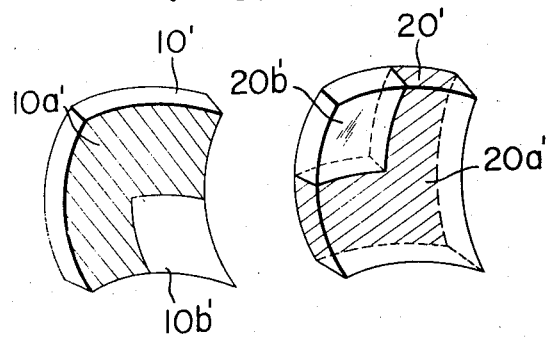
FIGS. 3A and 3B illustrate another embodiment of an adjustable diaphragm.
Figure 3B:
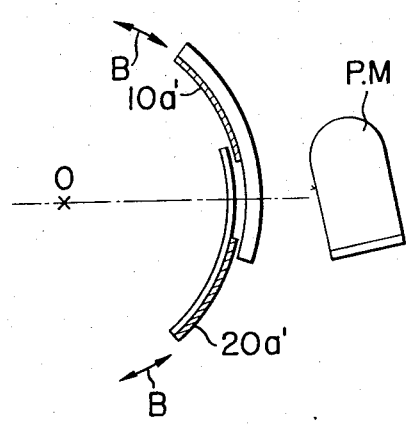

The diaphragm may be made with blades which are curved as shown in FIGS. 3A and 3B. The blades 10' and 20' are constructed in a manner similar to that of FIG. 2A, except that a curvature is imparted to the glass surface. Therefore, the size of the diaphragm aperture may be varied by moving the blades 10' and 20' about their general center of curvature 0, as indicated by the arrows B.

An adjustable diaphragm comprising curved blades has the following advantages:

1. since the curvature of the field of an image formed by a microscope optical system is generally great, the curvature of the field may be corrected by the use of focusing screen, that is, reflection portions 10*a*' and 20*a*' having a curvature; and 2. the magnitude of the light bundle reflected by the reflecting portions 10*a*' and 20*a*' may be controlled.

As shown by FIG. 3B, the cross-section of the reflected light bundle is made small by forming the stop blades 10' and 20' so that they furnish a concave surface facing the relay lens $L_2$, $L_1$. Consequently, the diameter of the relay lens $L_2$ may be small.

Figure 4:
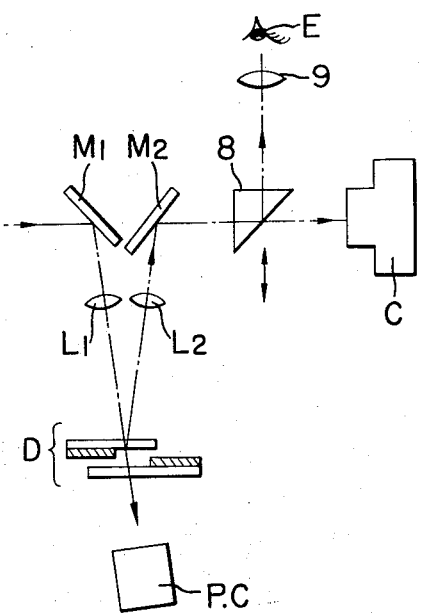

FIG. 4 shows the invention as applied to an astronomical telescope. In this embodiment, a portion or area to be measured within a field of view is selected by the aperture from an image which is formed by an objective lens 6 of the astronomical telescope T on a diaphragm D as hereinbefore described. A number of stars within the selected portion are measured by means of a photoelectric counter P.C. The other like designated elements and their mode of operation are the same as previously described.

Figure 5:
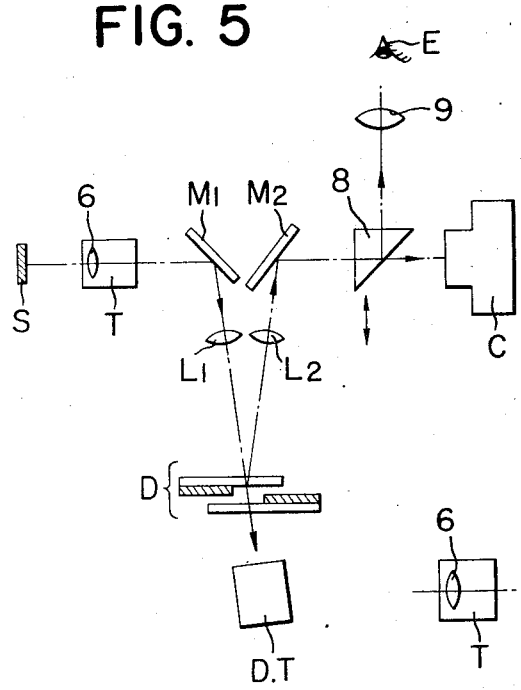
FIGS. 4 and 5 illustrate the invention as applied to an astronomical telescope and to an infrared radiation thermometer, respectively.

FIG. 5 shows the invention as applied to an infrared radiation thermometer or an infrared image device. A portion to be measured is selected by the diaphragm aperture from an image of the object S to be measured which is formed by the objective lens 6 of the telescope T on the diaphragm D. The infrared rays from the selected portion are measured by means of an infrared ray detecting device D.T., which measures temperature or temperature distribution of the object. Here, the telescope T, mirror $M_1$, relay lens $L_1$ and transparent portion of the variable diaphragm D have their own infrared ray transmitting and reflection characteristics.

As will be apparent from the described embodiments of the invention one is enabled to view or record a bright image, a portion to be measured can be selected from such image, and as a result the measuring operation becomes very simple and easy.

It is believed that the advantages and improved results furnished by the optical measuring device of the invention will be apparent from the foregoing detailed description of several embodiments of the invention. Various changes and modifications may be made without departing from the spirit and scope of the invention as sought to be defined in the following claims.

We claim:

1. An optical measuring device comprising an objective lens for forming an image of an object to be measured, an adjustable diaphragm disposed in a focal plane of the objective lens, the diaphragm having a plurality of overlapping blades defining a diaphragm aperture, the size of the aperture being adjusted by movement of the blades, each blade having a light-reflecting surface so that a part of light from the object focused by the lens on the diaphragm is passed through the diaphragm aperture while the remaining part of the light is reflected by the light-reflecting surfaces, measuring means disposed behind the diaphragm for receiving and measuring the light passing through the aperture, and a viewing optical system for receiving the light reflected by the light-reflecting surfaces.

2. An optical measuring device according to claim 1, wherein each blade has a light-reflecting portion and a light-transmitting portion, the light-transmitting portions overlapping to form the aperture.

3. An optical measuring device according to claim 2, wherein the light-transmitting portion is transparent glass.

4. An optical measuring device according to claim 2, wherein the blades are each made of metal having a light-reflecting surface and the light-transmitting portion comprises a portion cut out from the blade.

5. An optical measuring device according to claim 1, wherein each blade is curved to provide a concave surface for the light-reflecting surface.

6. An optical measuring device according to claim 2, wherein the blades are two in number, and the light-transmitting portions are each square.

7. An optical measuring device according to claim 6, wherein the aperture is square in shape and the blades are each moveable in equal amounts on a diagonal with respect to the square.

8. An optical measuring device according to claim 1, wherein the blades are transparent plates each having the light-reflecting surface formed at a portion of the surface thereof.

9. An optical measuring device according to claim 8, wherein the transparent plates are glass.

10. An optical measuring device according to claim 1, wherein the blades comprise a pair of transparent plates disposed adjacent each other, the light-reflecting surface of each plate being formed on the side of the plate facing the other plate.

* * * * *